United States Patent Office 2,781,295
Patented Feb. 12, 1957

2,781,295

CATALYST PROCESS FOR TREATING AN OIL WITH THE CATALYST

John W. Teter, Chicago, and Adolph I. Snow, Matteson, Ill., assignors to Sinclair Refining Company, New York, N. Y., a corporation of Maine No Drawing. Application November 19, 1954, Serial No. 470,124

6 Claims. (Cl. 196—28)

This invention relates to the treatment of hydrocarbons, more specifically, hydrocarbons derived from petroleum. Our invention relates to improved catalyst compositions and their use in reactions of petroleum hydrocarbons, particularly those conducted in the presence of free hydrogen such as hydrodesulfurization, hydrogenation and hydrocracking. The catalysts are advantageously employed in the hydrodesulfurization of petroleum hydrocarbons to control sulfur in distillate fuels and to prepare charge stocks for catalytic cracking and other catalytic conversion reactions. These new catalyst compositions contain certain mixtures of metal components supported on an alumina carrier.

Most petroleum fractions contain sulfur compounds which are predominantly organic in nature and include hydrogen sulfide, alkyl and cyclic sulfides and disulfides, mercaptans, thioethers, thiophenes, thiophanes, etc., which are of varying stability. The less stable sulfur compounds are conventionally removed by various sweetening processes, and catalytic hydrodesulfurization is employed to remove the more stable sulfur compounds, principally as hydrogen sulfide. These compounds are disadvantageous in stocks charged to catalytic operations as the sulfur tends to poison the catalysts. The sulfur compounds are further objectionable because of properties producing bad odors, corrosion, and engine wear and deposits. These difficulties have led to various proposals for desulfurization or hydrodesulfurization of almost all petroleum stocks including light distillates, middle and heavy distillates and even residual stocks. These fractions include as examples, gasoline, kerosenes, naphthas, diesel oils, heating oils, gas oils, residual and distillate fuel oils, lube stocks, and reduced crudes. The catalyst compositions of the present invention are useful in conversion reactions employing these petroleum fractions as charge stocks; however, the catalysts are particularly useful in reactions of petroleum hydrocarbons conducted in the presence of hydrogen such as hydrodesulfurization, hydrogenation and hydrocracking.

In the present invention, we have found that catalysts exhibiting outstanding utility in the noted reactions can be prepared by incorporating on an alumina support certain mixed metals and molybdenum. The mixed metals in the catalysts of the present invention are combinations of metals of atomic number of 25 to 26 with metals of atomic number of 28 to 30. Thus, we can combine manganese or iron or their mixtures with nickel, copper or zinc or their mixtures with molybdenum on an alumina support to afford our catalyst compositions. The catalysts are prepared from such mixtures providing a defined relationship between the mixed metals is maintained. That is, the various combinations of manganese and iron with nickel, copper and zinc must, on an approximately average basis, provide metal atoms with 26.5 to 27.5 electrons. Thus, in combining iron with nickel, approximately equal molar proportions could be provided in the catalysts since iron has 26 electrons while nickel has 28, which would, when present in equal molar amounts, provide an average of 27 electrons. In combining iron and copper, 2 moles of iron can be mixed with 1 mole of copper. As another example, when combining manganese with zinc, 3 moles of manganese can be mixed with 2 moles of zinc. These amounts of zinc and manganese are in addition to the amounts of zinc and manganese that combine with the base. Manganese as well as zinc might react with certain alumina supports and thus when calculating the amounts of these mixed metals necessary to provide in the catalyst compositions the proper amount of active mixed metal components, any metal combined with the base represents an additional amount necessary over and above that needed to give the metal atoms of 26.5 to 27.5 electrons. For instance, in Example III the alumina base contained the stoichiometric amount of zinc oxide that would be necessary to form zinc aluminate spinel ($ZnAl_2O_4$) and the active metal components were calculated on the basis that this zinc was not present. When using manganese or zinc, gamma-alumina can be employed as the catalyst base to avoid a reaction. In any given case, it is relatively simple to combine the proper proportions of the mixed metals to give the catalysts of this invention.

When our catalysts are at room temperature and pressure the mixed metals and the molybdenum can be in the free metallic state but most often they are present in combined form such as the oxide, sulfide or as another metal compound which affords the metal in some catalytically active form under the conditions of reaction. It is one postulation that through contact with hydrogen, for instance as in the hydrodesulfurization reaction vessel some of the mixed metal and molybdenum compounds are reduced to the metallic state which may be their active form. For instance, it has been found that in catalysts containing molybdena on an alumina support the molybdenum component catalyzes the formation of hydrogen deuteride from a mixture of hydrogen and deuterium at liquid nitrogen temperature which indicates the presence of the molybdenum as a metal. The catalysts can also be reduced to active state by pretreatment with a hydrogen containing gas at elevated temperatures and pressures. There is also postulation that the metal compounds, e. g., the sulfides, may be active components and even perhaps that the active catalyst includes the metals in the form of ions. Of course, this invention is not limited by theoretical explanations regarding the functioning of the catalysts.

The amounts of mixed metals and molybdenum in our catalysts are subject to considerable variation. Selection of particular amounts will depend upon many factors such as feed stock composition, degree of desulfurization desired, processing conditions, etc. In general, the weight of mixed metals calculated as oxides, in the catalysts comprises about 1 to 15 weight percent based on the finished catalysts while the molybdenum calculated as the oxide, comprises about 2 to 25 weight percent of the finished catalysts. The alumina base of our catalysts may be any of the various forms which include, for example, amorphous alumina, crystallite alumina and various alumina spinels or aluminates such as zinc spinels or the magnesium spinel bases described in U. S. patent application of Erickson, Serial No. 459,826, filed October 1, 1954. The base of the catalysts may comprise mixtures of these and other alumina forms.

Our catalysts can be prepared through precipitation in an aqueous medium of a mixture of water-soluble acid salts of aluminum and the mixed metals, such as the strongly acid nitrates, sulfates and chlorides, through neutralization to form alkaline solutions of the salts. To the aqueous slurry resulting from the neutralization the molybdenum is added, for instance, as a basic solution such as ammonium paramolybdate. In our preferred procedure, we add this hydrate as soon as possible to the alkaline slurry. In this method of preparation, ammonium hydroxide is normally employed to make alkaline the solution of aluminum and mixed metal salts; however, other alkalis such as sodium and potassium hydroxide can be employed. Before the molybdate is added, it is preferred to remove by aqueous washing various undesirable ions, such as sulfate, chloride, sodium and potassium. Thus, we prefer to use ammonium hydroxide and the nitrates of the metals to avoid the necessity for the washing operation. The alkali is added to the aqueous solution maintained at elevated temperatures of usually about 100° F. to 200° F., although temperatures from room to 300° F. or higher can be employed. The hot aqueous slurry containing the precipitated acid components can ordinarily be dried at temperatures from about 100 to 200° F. either with or without previous filtration of the slurry to separate the solids. The resulting catalyst solids are then ground, calcined and, if desired, formed into shaped particles by tabletting or extrusion. The formed particles can be recalcined to reduce further their water content. Calcination temperatures generally range from about 400 to 1100° F. Other methods may be employed in manufacturing our catalysts, for instance, the mixed metals and molybdenum can be deposited on a preformed alumina support.

In order to illustrate more specifically the preparation of our catalysts, the following specific examples are given but they are not to be considered limiting.

*Example I*

An aqueous solution was prepared by adding to 1700 mls. of water 900 grams of $Al(NO_3)_3 \cdot 9H_2O$, 15.6 grams of $Ni(NO_3)_2 \cdot 6H_2O$ and 25.7 grams of $Fe(NO_3)_3 \cdot 9H_2O$. This solution was heated to a temperature of 150° F. and neutralized to a pH of 7.5 through addition of $NH_4OH$ (1 part of $NH_4OH$ to 1 part of water) to form a slurry. To the hot, heavy slurry was added 400 mls. of an aqueous solution of 26.1 grams of $(NH_4)_6 \cdot Mo_7O_{24} \cdot 4H_2O$ (82% $MoO_3$), and the mixture was then stirred for ½ hour. The mixture was dried at 230° F. for 24 hours without filtering and with frequent stirring. The resulting solids were ground to less than 20 mesh, calcined 20 hours at 500° F., tabletted to pills ⅛ inch in length and ⅛ inch in diameter. The tabletted catalyst was recalcined at 900° F. for three hours and was designated No. 550G-3081. The catalyst had an apparent density of 0.72 gram per cubic centimeter, a crush of 1.9 pounds and the following analysis:

| | Weight percent |
|---|---|
| Volatile matter at 1200° F. | 1.97 |
| $MoO_3$ | 13.4 |
| Ni | 1.86 |
| Fe | 1.84 |

*Example II*

Another catalyst was prepared following the procedure of Example I except that 9.9 grams of $Cu(NO_3)_2 \cdot 3H_2O$ was substituted for the $Ni(NO_3)_2 \cdot 6H_2O$ of Example I and 28.5 grams of $Fe(NO_3)_3 \cdot 6H_2O$ was employed. This catalyst was designated No. 550G-3107 and had an apparent density of 0.99 gram per cubic centimeter and a crush of 27.4 pounds. Also, the tabletted pill size of this catalyst was ¹⁄₁₆ inch in length and ⅛ inch in diameter. The catalyst analyzed:

| | Weight percent |
|---|---|
| Volatile matter at 1200° F. | 0.85 |
| $MoO_3$ | 13.5 |
| Cu | 1.61 |
| Fe | 2.17 |

Portions of catalysts Nos. 550G-3081 and 550G-3107 were contacted under hydrodesulfurization conditions with a sour West Texas heating oil of the following analysis:

| | |
|---|---|
| API gravity | 37.4 |
| Flash PM, °F | 145 |
| KV/100° SSU | 33.9 |
| Cloud point, °F | −14 |
| Color NPA | 1.5+ |
| Mercaptan sulfur mg./100 cc | 60.5 |
| Total sulfur, weight percent | 0.77 |
| Copper strip corrosion at 212° F | NG |
| Aniline point, °F | 146.5 |
| Bromine No | 7.0 |
| Boiling point °F. (distillation): | |
| I. B. P | 338 |
| 50% | 488 |
| E. P | 676 |
| Olefins, weight percent | 9.1 |
| Aromatics, weight percent | 16.9 |

The catalyst was charged to a cold reactor which was then brought to desulfurization temperature of 680° F. by contact with hot hydrogen and pressured to 500 p. s. i. g. by gas containing 25 percent by volume of methane and 75 percent by volume of hydrogen. The sour West Texas heating oil was charged to the catalyst for six hours and the products for the last three hours of the test were used to determine the effectiveness of hydrodesulfurization since the first three hours of the test were employed to bring the catalysts to equilibrium. The heating oil was charged at a rate to maintain a 10.0 WHSV, i. e., 10 parts by weight of oil were charged each hour per part by weight of catalyst in the bed. The hydrogen containing off-gases were recycled to the reactor at the rate of 3500 cubic feet per barrel of heating oil treated. Hydrogen sulfide was trapped out of the recycled gases and enough extraneous hydrogen was added to maintain the pressure. The catalysts under these conditions were found to exhibit hydrodesulfurization activity.

*Example III*

500 grams of $Al(NO_3)_3 \cdot 9H_2O$ and 204.5 grams of $Zn(NO_3)_2 \cdot 6H_2O$ were added to 2000 mls. of water. The resulting solution was heated to 150° F. and 25.7 grams of $Fe(NO_3)_3 \cdot 6H_2O$ and 15.6 grams of $Ni(NO_3)_2 \cdot 6H_2O$ were added. To this solution was added $NH_4OH$ (1 part $NH_4OH$ to 1 part of $H_2O$) to neutralize to a pH of 7.0 to form a slurry. To the hot, thick slurry were thoroughly mixed 400 mls. of an aqueous solution of $(NH_4)_6Mo_7O_{24} \cdot 4H_2O$ (82% $MoO_3$). The slurry was oven dried at 230° F. for 24 hours without previous filtration. The dried product was calcined at 500° F. until evolution of nitrogen oxides ceased. This material was tabletted to pills ⅛ inch in length and ⅛ inch in diameter and recalcined for 6 hours at 900° F. The catalyst exhibited an apparent density of 0.72 gram per cubic centimeter and a crush of 1.5 pounds. The base of this catalyst was zinc oxide-aluminum oxide ($ZnO:Al_2O_3$). The catalyst was assigned No. 550G-3082 and analyzed:

| | Percent |
|---|---|
| V. M. at 1200° F | 1.16 |
| ZnO | 35.4 |
| $Al_2O_3$ | 44.5 |
| Ni | 1.85 |
| Fe | 2.07 |
| $MoO_3$ | 13.8 |

*Example IV*

A portion of the catalyst of Example I was crushed, and a 12 to 20 mesh fraction was separated and assigned No. 550H-3077.

A solid bed of this fraction was employed to desulfurize a light cycle oil from the fluidized catalytic cracking of a Near East crude. The light cycle oil had a gravity API of 23.8 and a distillation boiling range ASTM of 416° to 611° F. and contained 1.99 weight percent sulfur. The catalyst processed the light cycle oil for 714 hours at 720° F., 460 p. s. i. g., 2 WHSV and with 700 standard cubic feet of hydrogen sulfide free recycle gas per barrel of feed with very little decline in catalyst activity. During this period the sulfur removal was from about 91 to 95%. At 714 hours an attempt was made to foul the catalyst by reducing the gas recycle ratio to 200 standard cubic feet for 50 hours during which time the sulfur removal was at an average of 77%. At 764 hours total time the gas recycle ratio was returned to the normal 700 standard cubic feed until 817 total hours had passed. During the latter period the sulfur removal still averaged 91.5% and processing was continued to 873 hours at 820° F., 50 p. s. i. g., 10 WHSV and 700 standard cubic feet of recycle gas to try to foul the catalyst. During this period sulfur removal decreased from 70.5 to 51.0%. Upon return to normal conditions the sulfur removal averaged about 70% to a total time of 1012 hours. At this time the catalyst was regenerated by increasing the amount of air in a mixture with nitrogen to avoid sudden increases in temperature until undiluted air was being used. Pure nitrogen was used to bring the catalyst to 900° F. before air was added and the undiluted air flow was continued until the regeneration temperature reached 1100° F. After regeneration the reactor was cooled with nitrogen to 820° F. and with hydrogen to 720° F. Desulfurization was then resumed in the original conditions and the degree of sulfur removal indicated effective regeneration. During the next 200 hours the product sulfur level was constant enough to indicate a very low aging rate after the regeneration.

When our catalysts are employed in various reactions for converting petroleum hydrocarbons, conventional processing conditions can be employed. Reaction conditions to be observed in these operations can vary considerably, and are generally described, as hydrodesulfurization conditions, hydrogenation conditions, hydrocracking conditions, etc. These conditions include elevated temperatures and depend upon other variables, and the selection of particular operating values can be easily determined for a given reaction. Considering the hydrodesulfurization reaction, the temperature employed is usually from 500 to 1000 F., however, in treating charging stocks for catalytic processing the temperature is generally from about 500 to 850° F. Pressures employed can range from 1 to 100 atmospheres with 1 to 10 atmospheres being preferred to maintain the hydrocarbons in the vapor phase. The hydrocarbon is charged to the catalyst at a rate sufficient to provide adequate contact time to effect the desired degree of desulfurization and generally ranges from about 0.1 to 20 liquid volumes of hydrocarbon per volume of catalyst per hour. The amount of free hydrogen present in the reactor will depend upon the extent of desulfurization to be effected, the composition of the charge, the amount of free hydrogen in the charge, etc., and the amount will usually vary from about 50 to 10,000 cubic feet of hydrogen per barrel of hydrocarbon present in the reactor.

The petroleum conversion reactions of this invention can be conducted in a catalyst bed which is fixed, fluidized or in any other suitable form. In fixed bed operation, higher space velocities can be employed when using extruded catalysts of smallest size formed with low extrusion pressure to afford high permeability. In general, we have found that tabletting under high crushing forces gives less active catalysts of decreased permeability. Since the smaller catalyst particles are more active the use of a fluidized bed can be more advantageous since it affords maximum hydrocarbon through-put. In most cases it is more economical to regenerate the catalyst at periodic intervals coinciding with certain levels of carbon build-up on the catalyst particles. Regeneration can be accomplished by contact of the catalyst particles at elevated temperatures, e. g., from about 900 to 1100° F., with an oxygen-containing gas such as air.

We claim:

1. A hydrocarbon conversion catalyst comprising an alumina base having incorporated thereon about 2 to 25 weight percent of molybdenum and about 1 to 15 weight percent of mixed metals, said amounts of molybdenum and mixed metals being calculated as oxides, said mixed metals consisting essentially of a combination of metal of atomic number of 25 to 26 with metal of atomic number of 28 to 30, said mixed metals being combined in amounts to provide on an approximately average basis metal atoms of 26.5 to 27.5 electrons.

2. The catalyst of claim 1 in which the mixed metals consist essentially of approximately equal molar proportions of nickel and iron.

3. The method of hydroconversion of petroleum hydrocarbons which comprises contacting the hydrocarbons under conversion conditions in the presence of free $H_2$ with a catalyst comprising an alumina base having incorporated thereon about 2 to 25 weight percent of molybdenum and about 1 to 15 weight percent of mixed metals, said amounts of molybdenum and mixed metals being calculated as oxides, said mixed metals consisting essentially of a combination of metal of atomic number of 25 to 26 with metal of atomic number of 28 to 30, said mixed metals being combined in amounts to provide on an approximately average basis metal atoms of 26.5 to 27.5 electrons.

4. The method of claim 3 in which the mixed metals in the catalyst consist essentially of approximately equal molar proportions of nickel and iron.

5. The method of hydrodesulfurization of petroleum hydrocarbons which comprises contacting the hydrocarbons under hydrodesulfurization conditions with a catalyst comprising an alumina base having incorporated thereon about 2 to 25 weight percent of molybdenum and about 1 to 15 weight percent of mixed metals, said amounts of molybdenum and mixed metals being calculated as oxides, said mixed metals consisting essentially of a combination of metal of atomic number of 25 to 26 with metal of atomic number of 28 to 30, said mixed metals being combined in amounts to provide on an approximately average basis metal atoms of 26.5 to 27.5 electrons.

6. The method of claim 5 in which the mixed metals in the catalyst consist essentially of approximately equal molar proportions of nickel and iron.

References Cited in the file of this patent

UNITED STATES PATENTS

| Number | Name | Date |
|---|---|---|
| 1,908,286 | Dorrer | May 9, 1933 |
| 1,996,008 | Kaehler et al. | Mar. 26, 1935 |
| 2,116,061 | Dorrer | Mar. 3, 1938 |
| 2,392,579 | Cole | Jan. 8, 1946 |
| 2,559,457 | Montgomery | July 3, 1951 |
| 2,604,438 | Bannerot | July 22, 1952 |